United States Patent [19]
Conley

[11] 3,789,183
[45] Jan. 29, 1974

[54] THROUGH-INSULATION WELDING METHOD AND APPARATUS

[75] Inventor: Larry R. Conley, Fountain Valley, Calif.

[73] Assignee: Accra-Point Arrays Corporation, Santa Ana, Calif.

[22] Filed: Feb. 28, 1973

[21] Appl. No.: 336,811

[52] U.S. Cl.............. 219/92, 29/497.5, 219/78, 219/86, 219/119, 310/8.1
[51] Int. Cl.............................................. B23k 11/14
[58] Field of Search. 219/92, 78, 86, 118, 119, 233, 219/91; 29/DIG. 46, 497.5, 630 A; 310/8, 8.1, 8.2, 8.3, 8.7

[56] References Cited
UNITED STATES PATENTS

| | | | |
|---|---|---|---|
| 3,614,375 | 10/1971 | Becker................................ | 219/91 |
| 3,519,782 | 7/1970 | Mallery................................ | 219/78 |
| 2,946,119 | 7/1960 | Jones et al......................... | 219/86 X |
| 3,272,960 | 9/1966 | Smith.................................. | 219/92 X |
| 3,350,582 | 10/1967 | Attwood et al.................... | 310/8.3 X |
| 3,524,083 | 8/1970 | Last et al.......................... | 310/8.7 X |
| 3,357,090 | 12/1967 | Tittany............................... | 29/497.5 |
| 3,673,681 | 7/1972 | Stevanko.......................... | 219/119 X |
| 3,578,940 | 5/1971 | Sands................................ | 219/92 X |

Primary Examiner—Bruce A. Reynolds
Attorney, Agent, or Firm—Lindenberg, Freilich & Wasserman

[57] ABSTRACT

A weld is made between an insulated wire and a terminal by pressing the wire against the terminal with an electrode, applying ultrasonic vibrations to the electrode to scrub away insulation so that electrical contact is made between the central conductor of the wire and both the terminal and electrode, and then applying a welding current through the electrode to flow through the wire and terminal to weld them together.

14 Claims, 8 Drawing Figures

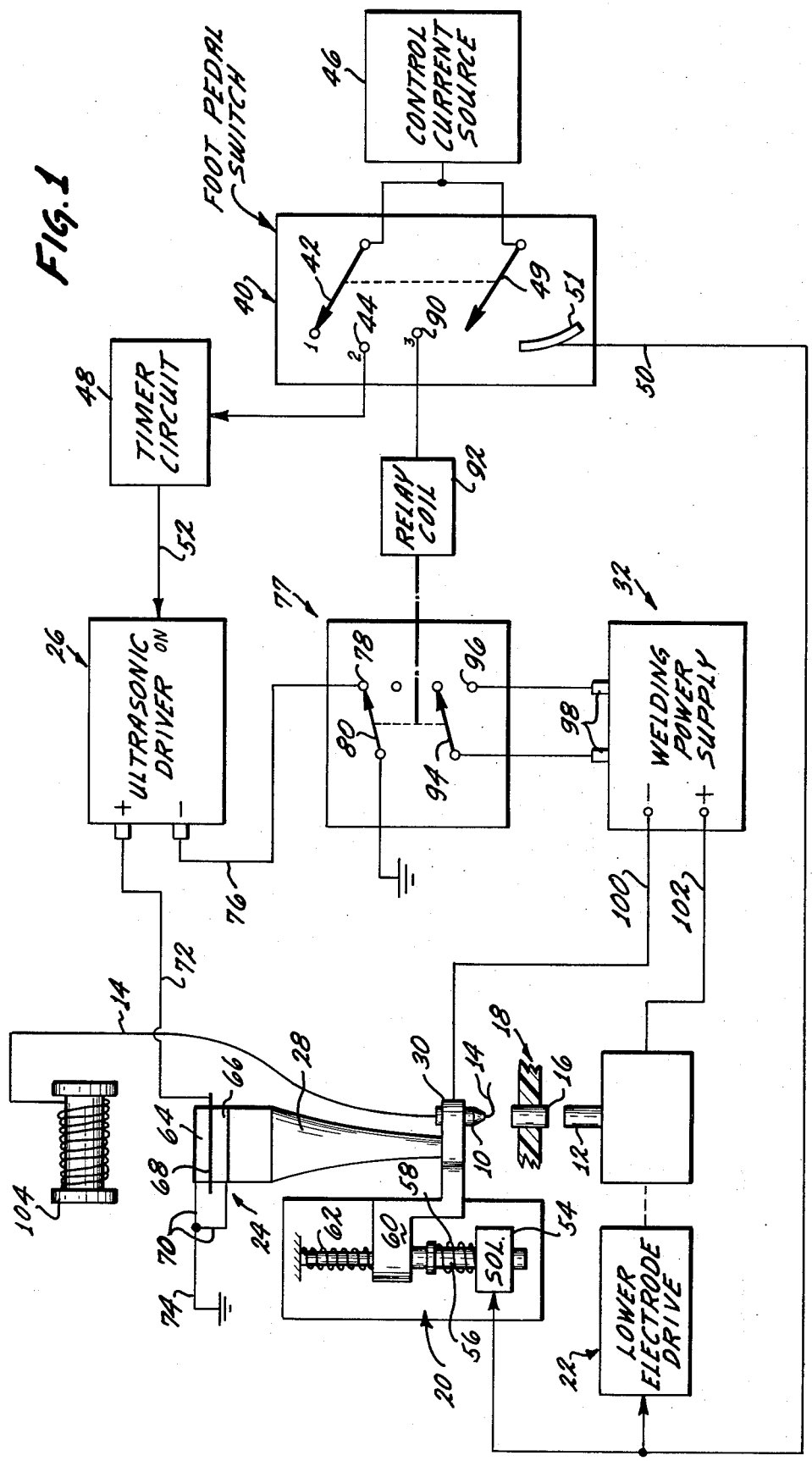

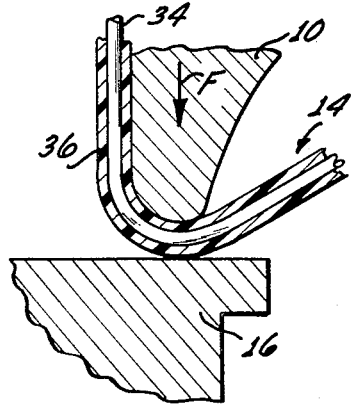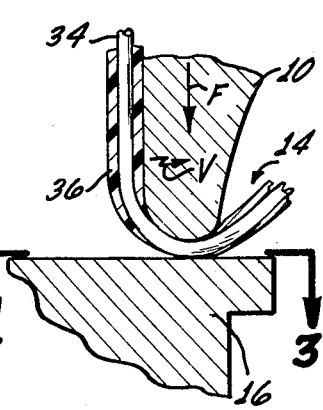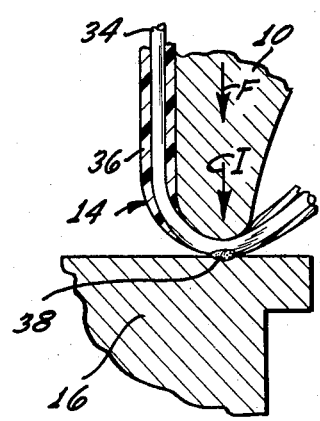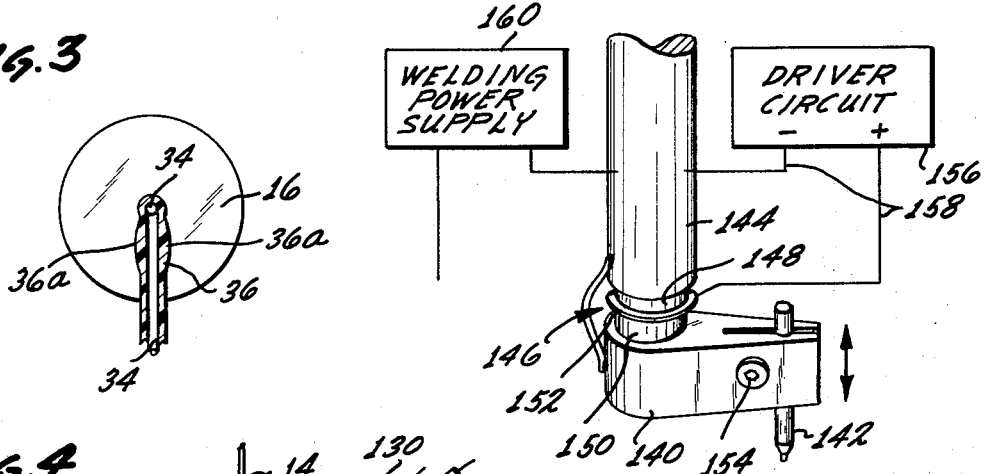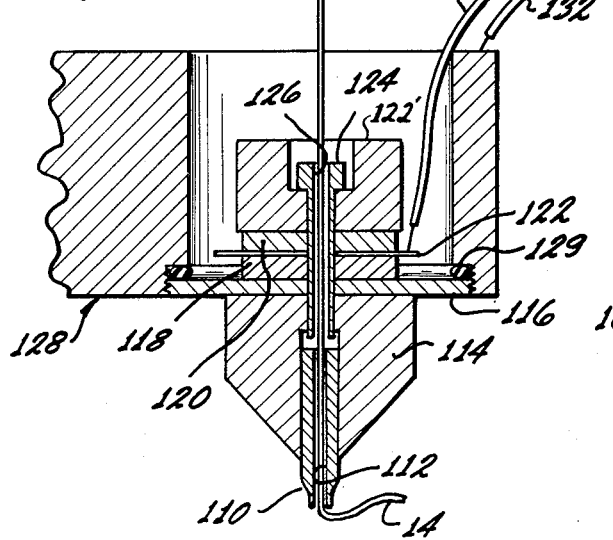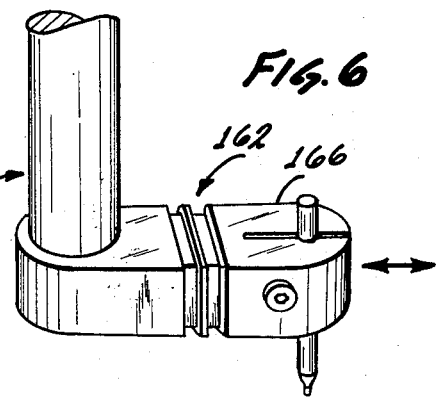

THROUGH-INSULATION WELDING METHOD AND APPARATUS

BACKGROUND OF THE INVENTION

This invention relates to methods and apparatus for welding an insulated wire to a terminal.

Complex electronic assemblies often include large numbers of closely spaced miniature terminals which must be electrically interconnected. Such interconnections can be made using continuous wires that are welded at various points therealong to the different terminals. Insulated wires are generally employed, and therefore apparatus must be provided to form welds through the insulation to connect the central conductor of the wire to the terminal.

One method which has been used for through-insulation welding includes pressing a welding electrode against the insulated wire to force it against the terminal with enough force to rupture the insulation. Such cold deformation of the insulation establishes electrical contact between the central conductor of the wire and both the terminal and electrode. Welding current is then passed through the electrode and through the wire and terminal to weld the wire to the terminal. In a typical machine that employs this method, the electrode is rapidly lowered against the wire so that the electrode punches through the insulation. As soon as the force on the electrode reaches a predetermined level which has been found sufficient to assure breakthrough of the insulation, a welding current supply is automatically turned on. The insulation-rupturing force for many wires is relatively large such as at a level of ten pounds, while the welding force for the wire must be at a lower level such as three and one-half pounds in order to form a good weld. Such a welding technique is described in U.S. Pat. Nos. 3,596,044 and 3,627,970. This method of welding has the disadvantage that it works well only for insulation which readily ruptures at moderate pressures, such as type FEP Teflon (fluorethylene propylene). Many other types of insulation which are tougher and which exhibit better cut-through resistance, such as type TFE Teflon, Tef-Zel, Kynar, and polyurethanes, do not readily rupture, and the above welding technique does not work well with these insulations.

SUMMARY OF THE INVENTION

In accordance with one embodiment of the present invention, an apparatus and method is provided for welding insulated wires to terminals, which is readily usable for a wide variety of insulation materials and which produces welds of a consistent high quality when used with either the easily ruptured or tougher insulation materials. The weld-forming method includes pressing a welding electrode against an insulated wire to press the wire against a terminal, and applying vibrations to the electrode. The vibrations scrub away insulation around the central conductor of the wire, to establish an electrical connection between the central conductor and both the terminal and electrode. Welding current is then passed through the electrode to flow through the central conductor of the wire and the terminal to weld them together. The force with which the electrode is pressed against the wire during the scrubbing is generally lower than the force required to statically rupture the insulation, and in fact, this force may be the same as the force applied during the flow of welding current.

The novel features of the invention are set forth with particularly in the appended claims. The invention will best be understood from the following description when read in conjunction with the accompanying drawings.

BRIEF DESCRIPTION OF THE DRAWINGS

FIG. 1 is a partially side elevation and partially block diagram view of a welding system constructed in accordance with the present invention;

FIGS. 2A–2C are magnified sectional views of the tip region of the welding electrode assembly of FIG. 1, showing several stages in the welding method of the invention;

FIG. 3 is a sectional view taken on the line 3—3 of FIG. 2B.

FIG. 4 is a partial sectional view of a welding head assembly constructed in accordance with another embodiment of the invention;

FIG. 5 is a partial perspective view of a welding head assembly constructed in accordance with still another embodiment of the invention; and FIG. 6 is a partial perspective view of a welding head assembly constructed in accordance with yet another embodiment of the invention.

DESCRIPTION OF THE PREFERRED EMBODIMENTS

FIG. 1 illustrates a welding system of the invention which includes a pair of opposed electrodes 10, 12 that are used to weld regions of a continuous wire 14 to pin-like terminals 16 of a circuit assembly 18. The system includes upper and lower drives 20, 22 for moving the electrodes vertically against the pin 16, and a transducer 24 for vibrating the upper electrode 10. An oscillator, or ultrasonic driver 26 generates electrical currents that energize the transducer 24, while an acoustical horn 28 transmits vibrations from the transducer to an electrode holder 30 to vibrate the electrode. The ultrasonic vibrations remove insulation of the wire to provide a path for welding current through the central conductor of the wire 14. Welding current is applied by a welding power supply 32 to the two electrodes 10, 12 to apply a voltage or potential between them, so that current can flow between the central conductor of the wire 14 and the terminal 16 to weld them together.

FIGS. 2A–2C illustrate various steps in the welding process of the invention. FIG. 2A illustrates a first step, which includes pressing the upper electrode 10 against the insulated wire 14 to press the wire against the terminal 16. The wire 14 includes a central conductor 34 of a weldable electrically conductive material such as a nickel alloy, and a layer of insulation 36 surrounding the conductor. The electrode 10 is pressed down with a force F which is normally less than the force required to cold flow or rutpure the insulation 36 even in the case of insulation material that can be ruptured by a moderately high force.

FIG. 2B illustrates a next step in the process, which includes applying vibrations, indicated by arrow V, to the electrode 10. The vibrations are applied at a sufficient intensity and for a sufficient time to scrub away a region of the insulation 36 which lies directly under the electrode 10. The force F is maintianed during the application of the vibrations in order that the electrode 10 can effectively scrub away the insulation. The insulation is scrubbed away not only between the electrode 10 and the conductor 34 of the wire, but also between the conductor 34 and the terminal 16. It is believed that the electrode 10 first scrubs away insulation between it and the conductor 34, and that the electrode 10 then vibrates the conductor 34 so that the vibrating conductor scrubs away the insulation between it and the terminal 16 at the region where it presses the insulation against the terminal. The electrode 10 does not press hard against any other regions of the wire, and therefore there is no damage to an region of the insulation other than the region directly under the tip of the electrode 10. As illustrated in FIG. 3, the insulation portions 36a that are protected from compression by the central conductor are normally not removed; only where the central conductor faces the electrode and terminal is insulation removed. As a result of the vibrations during the application of the downward force, the central conductor 34 of the wire directly contacts both the terminal 16 and the electrode 10.

FIG. 2C illustrates a next step in the process, which involves applying a welding current, indicated by arrow I, through an electrode 10 to flow through the central conductor 34 and terminal 16. This current is applied while the downward force F is applied on the electrode 10 to press it against the wire and to press the wire against the terminal 16. The current I forms a weld 38 between the conductor 34 and terminal 16. After the weld has been formed, the electrode 10 is lifted and moved to a position over another terminal of the circuit board assembly to weld the wire 14 to that terminal.

Referring again to FIG. 1, it can be seen that the welding system includes various circuits and controls for performing the welding method. An operator begins a welding cycle by depressing a foot pedal switch 40 to move a switch member 42 thereof from an initial position illustrated in the figure into contact with a switch contact 44. The switch 40 that carries current from a control current source 46 to a timer circuit 48. The foot pedal switch has another switch member 49 that moves in unison with the switch member 42, to connect the current source 46 to a contact 51. As soon as the foot pedal switch is depressed, the contact 51 delivers a current through line 50 to the electrode drives 20, 22, to raise the lower electrode 12 and lower the upper electrode 10 towards the terminal 16. The upper drive 20 includes a solenoid 54 which pulls down a plunger 56 against the force of a spring 58 to permit an electrode assembly holder 60 to move down. A spring 62 constantly presses down the holder 60 with an accurately known force, so that the assembly 30 and upper electrode 10 thereof are pressed down against the terminal 16 with a closely controlled force.

A brief time after the electrode drives have been energized, the timer circuit 52 applies a current through its output 52 to the ultrasonic drive 26 to turn it on for a brief time period. The ultrasonic drive 26 than generates a high frequency current that is delivered to the transducer 24 to energize it. The transducer 24 includes a pair of crystals 64, 66 of the type that vibrates at a large amplitude when currents are applied thereto, such crystals as those of lead zirconate titanate being suitable for this purpose. The vibration assembly includes a contact washer 68 located between the crystals and a pair of end contacts 70 connected to the crystals. The contact washer 68 is connected through a line 72 to an output of the ultrasonic driver 26, while the contacts 70 are connected through a line 74 to ground. The ultrasonic drive 26 has another output connected through a line 76 and switch 77 to ground, the switch 77 having a contact 78 and a switch member 80 that lead to ground potential. When the drive 26 is on, the transducer 24 vibrates the solid metal acoustic amplifier cone 28 that leads to the electrode holder 30. The cone 28 is dimensioned to provide a large amplitude of vibrations at the holder 30 so that the electrode 10 is vibrated at a considerable amplitude to scrub the insulation off the wire.

As mentioned above, the operator first depresses the foot pedal switch 40 to move the switch members 42 and 49 and thereby lower the upper electrode 10 and apply vibrations thereto. The foot pedal switch 40 is of a type which can be depressed hard to cause the switch member 42 to move out of engagement with contact 44 and into engagement with another contact 90 of the switch assembly. (The other switch member 49 remains engaged with its contact 51 even when the foot pedal is depressed hard). This hard depression of the foot pedal results in current from the source 46 flowing through the contact 90 to a relay coil 92 that moves the switch member 80 and another switch member 94. Movement of the switch member 80 out of engagement with contact 78 that leads to the ultrasonic driver 26, results in isolation of the driver 26 from ground potential to protect it from welding currents. Movement of the other switch member 94 brings it into engagement with a contact 96 to complete a circuit through a pair of control terminals 98 of the welding power supply 32 to turn it on. The welding power supply 32 than supplies a welding potential between its outputs 100, 102 that are respectively coupled to the upper and lower electrodes 10, 12.

When the welding power supply is turned on, an electrical circuit has already been completed through the electrode 10, the central conductor of the wire 14, the terminal 16, and the lower electrode 12, so that welding current can flow to weld the conductor to the terminal. The welding power supply 32 includes a current regulator and timer (not shown) that provides a level of welding current for a time period that will produce a good weld, and thereafter no welding current is applied until the next time that the starting terminals 98 are interconnected.

The time period during which the electrode 10 is vibrated to scrub away insulation on the wire, and the time period which welding current is applied to the electrodes are normally a fraction of a second each, for the welding of small wires typically used in the construction of circuit board assemblies. For example, ultrasonic vibrations may be applied to the electrode 10 at a frequency of 50 kHz for a period of 100 milliseconds, followed by the application of welding current for a period such as three milliseconds, while maintaining a constant downward fPrce of 4½ pounds on the electrode 10. The operator can depress the foot pedal switch 40 with a low pressure and then a greater pressure to complete the vibration and welding, and she may then release the foot pedal switch. A control can be provided so that the operator merely depresses a foot pedal switch with one pressure, and the vibration and welding steps are automatically performed in sequence. After the operator releases the foot pedal switch, she depresses a button (not shown) that operates a numerically controlled positioning device (not shown) that repositions the circuit board assembly 18 to move a next terminal thereof under the electrode 10. During such movement of the circuit board assembly 10, the wire 14 is payed off a reel 104, so that a continuous length of wire may be welded at many locations to terminals of the circuit board.

In constructing the apparatus that vibrates the elctrode 10 and then passes welding current through it, care must be taken to prevent damage to the ultrasonic driver 26 from welding current. The switch assembly 77, including the relay 92 thereof, prevents welding current from flowing through the ultrasonic driver, by automatically disconnecting the driver 26 from ground prior to turning on the welding power supply 32.

The factors that must be considered in scrubbing off wire insulation include the frequency of the vibrations, the amplitude of vibrations at the electrode 10, the pressure of the electrode 10 against the wire, and the type of insulation. The equipment often can be simplified by utilizing the same force during scrubbing of insulation as is required for welding, so that it is not necessary to provide equipment for pressing down the electrode at two different pressures or to alternate between the pressures at different times in the cycle of operation. Also, an ultrasonic driver 26 with a constant frequency and output amplitude may be utilized with only the time period being varied. The time period during which vibrations are applied should not be too long, or else the central conductor 34 of the wire may be deformed. A wide range of vibration frequencies may be utilized, although frequencies on the order of 50 kHz have been found to work well for small wires of the type typically used in constructing circuit board assemblies.

The use of electrode vibration to remove insulation from a wire just prior to resistance welding permits through-insulation welding for a wide range of insulation materials. A previous through-insulation welding technique which utilizes only high pressure to rutpure the insulation was useable only with cold flowable material such as type FEP Teflon. The present vibration technique can be utilized with insulation materials such as type TFE Teflon, Tef-Zel, Kynar, and polyurethanes, which are tougher and exhibit better abrasion and cut-through resistance than type FEP Teflon. The vibration or scrubbing action at the welding tip also has the important advantage that it removes oxide particles and solvent residue from the welding interfaces, thereby producing more consistent welds. In previous through-insulation techniques which utilized only high pressure to rupture the insulation, the weld quality could be seriously affected by particles of foreign material that happend to be present at the welding interfaces and which would not be displaced merely by high pressure.

The use of electrode vibration also has been found to produce good welds over a wider range of welding power inputs, than has been possible for the previous method which utilized a high initial force to rupture the insulation. This is important because common power supplies such as the capacitor discharge type provide a variable output due to aging of the capacitor and incomplete regulation of line voltage. It is believed that the vibration method produces good welds even at the low range of settings on the power supply because vibrations produce a more consistently low resistance along the current path, and that good welds are produced even at the high range of settings on the power supply because the absence of a high insulation-rupturing pressure reduces the possibility of damage to the central conductor of the wire that can occur during insulation removal.

Thus, the method and apparatus of the present invention not only permits the application of through-insulation welding to a wider range of insulation materials, but produces more consistent welds for all types of insulation and over a wider range of welding power supply outputs. In addition, the technique eliminates the need to provide an initial very high pressure for rupturing insulation, so that both removal of insulation as well as resistance welding can be performed at moderate forces, and in fact may be performed at the same force level to simplify the equipment. It is possible to change the downward force on the electrode 10 between the vibrating step and the application of welding current, but it is desirable to avoid lifting the electrode entirely off the wire before resistance welding to avoid the possibility that contaminating foreign material will be introduced at the weld point. It should be noted that while vibrations for scrubbing away the insulation are usually most easily applied through the resistance-welding electrode, it is possible to apply vibrations in other ways, as by vibrating the terminal.

FIG. 4 illustrates a welding head assembly constructed in accordance with another embodiment of the invention, which provides a compact assembly for scrubbing and resistance welding. The assembly includes an electrode 110 of a material such as copper-tungsten, with a central passageway 112 through which the wire 14 extends and a metal block 114 of a material such as aluminum for holding the electrode. A washer 116 supports a transducer which includes a pair of crystals 118, 120 and a contact washer 122 between them. A crystal cap 122' rests upon the crystals. The cap 122', crystals, and block 114 all have central holes, and a bolt 124 extends through these holes and is threaded at its lower end into the block 114 to hold the assembly together. The bolt 124 has a central passage 126 through which the wire 14 extends to the electrode 110. The washer 116 is threaded at its periphery to a holder 128 that is attached to a drive mechanism that raises and lowers the assembly against and away from a terminal. An elastomeric O-ring 129 assures a tight fitting of the washer 116 in the holder 128 while minimizing the transfer of vibrations to the holder 128 so that a minimum of vibration energy is lost therethrough. A pair of leads 130, 132 connect to an ultrasonic driver for providing currents to drive the crystal structure. Another lead (not shown) connects to the block 114 to supply welding currents thereto. This assembly is compact and provides efficient transfer of vibrations from the crystal structure to the electrode with a minimum of loss to other masses in the vicinity of the electrode.

FIGS. 5 and 6 illustrate welding head assemblies constructed in accordance with further embodiments of the invention, wherein simplified mounting and efficient coupling of vibrations is achieved. In FIG. 5, an electrode mount 140 holds the welding electrode 142, and the mount is supported on a holder 144 by a vibration source 146. The vibration source includes a pair of crystals 148, 150 separated by a conductive washer 152. One crystal 148 is fastened by epoxy cement that contains copper filings to the holder 144, while the other crystal 150 is fastened by epoxy cement containing copper filings to the electrode mount 140. The holder 144 is a metal bar while the mount 140 is a metal member with a slot for receiving the electrode and a screw 154 for closing the slot to clamp the electrode in place. A crystal driver 156 applies current between the washer 15 and the opposite crystal faces. A cable 158 electrically connects the holder 144 and mount 140. A welding supply 160 supplies welding current to the electrode 142 and another electrode. The epoxy cement layers provide good mechanical coupling of the electrode holder to the vibration source as well as an electrical path. The welding head of FIG. 6 is similar to that of FIG. 5, except that the vibration source 162 produces horizontal vibrations instead of vertical vibrations. This is accomplished by using a holder 164 that holds the crystals of the vibration assembly so they vibrate the electrode holder 166 in a horizontal direction. The actual vibration mode at the tip of the electrode is difficult to predict, but either direction of vibrations at the electrode holder can cause removal of insulation of a wire that presses against the electrode tip.

The present invention therefore provides a method and apparatus for creating welds between an insulated wire and a terminal, which can be employed with a wide variety of wire insulation materials and which produces high consistent welds using equipment of minimum complexity. The method involves the application of vibrations to a resistance welding electrode as it presses a wire against a terminal, to cause the scrubbing away of insulation between the central conductor of the wire and both the terminal and electrode, and the application of welding current through the electrical path thus established to weld the central conductor of the wire to the terminal. The pressure employed during the scrubbing step is lower than that required to cold flow or rupture the insulation in the absence of vibrations, and in fact, may be of the same level as the force used during the subsequent resistance welding step. The apparatus includes a vibration mechanism such as a crystal transducer which is driven by an oscillator, and the oscillator is protected from welding current by utilizing a switch that automatically disconnects the oscillator from a ground potential whenever the welding current supply is turned on. A variety of vibration sources can be utilized, including magnetostrictive devices and motor driven mechanical vibrators.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A method for through-insulation welding to a terminal, of a wire that includes a central conductor which is surrounded by an insulator, comprising:
   pressing the wire against the terminal with a resistance-welding electrode;
   establishing vibrations at the region where the wire is pressed between the electrode and the terminal to scrub insulation from the central conductor at the locations thereof facing the electrode and terminal, so the central conductor and terminal come into physical contact; and
   flowing welding current in a series path through the electrode, central conductor, and terminal while the electrode presses the central conductor against the terminal, so that welding current flows between the central conductor and terminal at the point where they are in physical contact, to weld the central conductor to the terminal.

2. The method described in claim 1 wherein:
   said electrode is maintained pressed against said wire during the entire period between said step of establishing vibrations and said step of flowing welding current, whereby to prevent contamination prior to resistance-welding of the welding points that have been scrubbed clean.

3. The method described in claim 1 wherein:
   said electrode presses at a substantially constant force level which is less that the force level required to rupture the insulation by pressure alone, during both said step of establishing vibrations and said step of flowing welding current.

4. The method described in claim 1 wherein:
   said steps of establishing vibrations and flowing welding current include energizing a transducer which is acoustically coupled to the electrode and then establishing a welding potential between said electrode and a second electrode that contacts the terminal.

5. In a method of welding an electrical conductor which is coated with electrical insulating material, to an electrically conductive terminal by means of a welding assembly which includes first and second electrodes, the steps comprising:
   pressing at least the first electrode towards the terminal so that a portion of the insulation-coated conductor is caught between the first electrode and the terminal;
   vibrating said first electrode while maintaining it pressed against the insulation-coated conductor to remove the insulation so that the conductor establishes an electrical path between the first electrode and the terminal;
   establishing electrical contact between the second electrode and the terminal; and
   applying a welding potential between the first and second electrodes while the second electrode is electrically coupled to said terminal and the first electrode is maintained in electrical contact with the terminal through the wire.

6. The method described in claim 5 wherein:
   said steps of vibrating and applying a welding potential are performed at the same force level of the first electrode towards the conductor.

7. The method described in claim 5 wherein:
   said vibrating of said first electrode is terminated prior to the application of a welding potential between the electrodes.

8. Apparatus for through-insulation welding to an electrical terminal, of a wire that includes a central conductor and a covering of insulation thereabout, comprising:
   an electrode with a tip;
   means for leading the wire across at least a portion of said tip;
   means for pressing the electrode towards a terminal so that the electrode presses the wire against the terminal;

means for creating vibrations at the region where the wire is pressed between the electrode and terminal to remove insulation at the locations thereat where the central conductor faces the electrode and terminal; and means for establishing a welding potential between said electrode and terminal to flow a current therebetween through said central conductor.

9. The apparatus described in claim 8 wherein:

said means for pressing maintains a constant pressure during operation of said vibration creating means and said means for establishing an electrical potential.

10. Apparatus for welding a wire that includes an insulation-covered electrical conductor, to a terminal, comprising:

an electrode assembly including first and second electrodes;

means for pressing said first electrode toward said terminal with said wire therebetween so the first electrode presses the wire against the terminal, and for moving said second electrode into electrical contact with the terminal;

means for vibrating said first electrode while it presses the wire against the terminal to remove insulation on the wire and thereby establish an electrical connection between the first electrode and the terminal through the electrical conductor; and power means for applying a welding potential between said electrodes while the first electrode presses the wire against the terminal and the second electrode is in electrical contact with the terminal, to flow a welding current through the electrical conductor and terminal.

11. The apparatus described in claim 10 wherein:

said pressing means presses said first electrode toward said terminal with a constant force during operation of said vibrating means and power means.

12. The apparatus described in claim 10 wherein:

said vibrating means includes a transducer, an electrically conductive member acoustically coupling the transducer to the first electrode, an oscillator, first and second signal conductors for connecting said oscillator to said transducer, and a signal switch in series with said first signal conductor; and said power means includes a power switch which is closeable to apply said welding potential between the electrodes; and including means for automatically opening said signal switch prior to closing said power switch.

13. In a method of welding an electrical conductor which is coated with electrical insulating material, to an electrically conductive terminal by means of a welding assembly which includes first and second electrodes, the steps comprising:

pressing at least the first electrode towards the terminal so that a portion of the insulation-coated conductor is caught between the first electrode and the terminal;

vibrating a ring-shaped transducer coupled to said first electrode while maintaining the first electrode pressed against the insulation-coated conductor to remove the insulation so that the conductor establishes an electrical path between the first electrode and the terminal;

applying a welding potential between the first and second electrodes while the second electrode is electrically coupled to said terminal and the first electrode is maintained in electrical contact with the terminal through the wire; and feeding the insulation-coated conductor through the ring-shaped transducer.

14. Apparatus for through-insulation welding to an electrical terminal, of a wire that includes a central conductor and a covering of insulation thereabout, comprising:

an electrode with a tip;

means for leading the wire across at least a portion of said tip, including walls forming a passageway in the electrode;

means for pressing the electrode towards a terminal so that the electrode presses the wire against the terminal;

means for creating vibrations at the region where the wire is pressed between the electrode and terminal to remove insulation at the locations thereat where the central conductor faces the electrode and terminal, including a transducer with a central hole coaxial with said passageway in said electrode acoustically coupled to said electrode, and an oscillator coupled to said transducer to drive it, said wire extending through said hole in said transducer; and means for establishing a welding potential between said electrode and terminal to flow a current therebetween through said central conductor.

* * * * *